(12) United States Patent
Gorny et al.

(10) Patent No.: US 6,841,240 B2
(45) Date of Patent: Jan. 11, 2005

(54) MULTILAYERED ARTICLE

(75) Inventors: Rüdiger Gorny, Krefeld (DE);
Siegfried Anders, Köln (DE);
Wolfgang Nising, Sankt Augustin (DE)

(73) Assignee: Bayer Aktiengesellschaft, Leverkusen (DE)

( * ) Notice: Subject to any disclaimer, the term of this patent is extended or adjusted under 35 U.S.C. 154(b) by 45 days.

(21) Appl. No.: 10/313,609

(22) Filed: Dec. 6, 2002

(65) Prior Publication Data

US 2003/0148093 A1 Aug. 7, 2003

(30) Foreign Application Priority Data

Dec. 10, 2001 (DE) .......................................... 101 60 569

(51) Int. Cl.$^7$ ........................... B32B 5/16; B32B 27/08; B29C 47/06
(52) U.S. Cl. ....................... 428/323; 428/328; 428/337; 428/412; 428/480; 264/173.12
(58) Field of Search ................................ 428/328, 323, 428/412, 480, 337; 264/173.12

(56) References Cited

U.S. PATENT DOCUMENTS

| | | | |
|---|---|---|---|
| 5,108,835 A | 4/1992 | Hähnsen et al. ............ | 428/334 |
| 5,154,768 A | 10/1992 | Yamada et al. ............. | 106/450 |
| 5,654,083 A | 8/1997 | Venema ...................... | 428/215 |
| 5,709,929 A | 1/1998 | Venema ...................... | 428/215 |
| 6,149,995 A  * | 11/2000 | Peiffer et al. .............. | 428/35.8 |
| 6,376,075 B1 * | 4/2002 | Tacke-Willemsen et al. ..... | 428/402 |
| 6,692,824 B2 * | 2/2004 | Benz et al. ................. | 428/328 |

FOREIGN PATENT DOCUMENTS

| | | |
|---|---|---|
| CA | 2029941 | 5/1991 |
| DE | 198 18 569 | 11/1997 |
| DE | 100 06 651 | 8/2001 |
| EP | 0 110 221 | 4/1987 |
| EP | 0 523 888 | 1/1993 |
| EP | 0 548 822 | 6/1996 |
| WO | 96/26070 | 8/1996 |

* cited by examiner

*Primary Examiner*—Monique R. Jackson
(74) *Attorney, Agent, or Firm*—Joseph C. Gil; Aron Preis

(57) ABSTRACT

A multilayered article made of a plastic material which exhibits high IR reflection and a high gloss is disclosed. The article includes at least three layers A, B and C, wherein layer A contains a transparent thermoplastic plastics material, and wherein layer B contains a transparent thermoplastic plastics material and a pigment which consists of a transparent support material and a titanium dioxide layer of thickness 150 to 200 µm, and where layer C contains a transparent thermoplastic plastics material.

8 Claims, No Drawings

MULTILAYERED ARTICLE

FIELD OF THE INVENTION

This invention relates to a plastic article and more particularly to a multilayered article having high IR reflection and a high gloss.

SUMMARY OF THE INVENTION

A multilayered article made of a plastic material which exhibits high IR reflection and a high gloss is disclosed. The article includes at least three layers A, B and C, wherein layer A contains a transparent thermoplastic plastics material, and wherein layer B contains a transparent thermoplastic plastics material and a pigment which consists of a transparent support material and a titanium dioxide layer of thickness 150 to 200 µm, and where layer C contains a transparent thermoplastic plastics material.

BACKGROUND OF THE INVENTION

Multilayered products are known which comprise layers that contain transparent thermoplastic plastic materials.

Polycarbonate sheets are known in particular. They are produced for a multiplicity of purposes of use. They are produced, for example, by the extrusion of compositions which contain polycarbonate (molding compositions) and optionally by coextrusion with molding compositions which have an increased content of UV absorbers.

Polycarbonate sheets are known from EP-A 0 110 221.

For the long-term protection of polycarbonate sheets from yellowing due to UV light, EP-A 0 320 632 teaches that the sheets can be provided with a coextrusion layer which contains high concentrations of UV absorbers that have low volatility.

EP-B 0 678 376 and EP-B 0 595 413 teach that for sheets made of polyesters, particularly sheets comprising copolyesters formed from aromatic dicarboxylic acids and mixtures of two aliphatic diols, e.g. PETG, protection from weathering is achieved by coextrusion with outer layers which contain high concentrations of UV absorbers, e.g. those based on benzotriazoles.

A panel made of polymethyl methacrylate with a content of light-reflecting particles aligned parallel to the surface is known from German Patent Specification DE-C 25 44 245. Its layer thickness is designed so that visible light is substantially transmitted and infrared radiation is substantially reflected.

This known body contains light-reflecting particles, which are contained in the base material that is made of polymethyl methacrylate. They are incorporated in the liquid methyl methacrylate monomer, and the latter is introduced into a polymerization chamber formed by parallel glass plates and is partially polymerized. Until this point in time, the particles have descended on to the lower glass plate. The particles are aligned parallel to the surface by a parallel displacement of said plate and are held in this position whilst polymerization is continued. Due to this treatment step, this method of production is costly.

EP-A 340 313 describes solar radiation coatings for ships, tanks, buildings and the like, in order to reduce the heating thereof in the sun. These coatings contain a binder and a heat-reflecting pigment, and optionally contain any desired coloring pigments.

According to EP-A 428 937, sheets of polyethylene for greenhouses are provided by brushing or spraying with a coating which contains light-reflecting pigments in a matrix of lacquer binder vehicles. Since the pigment particles are not oriented by the application process, they only exert a shading effect and result in unsatisfactory transmission, and due to the slight extent of adhesion of customary lacquer binder vehicles to polyethylene, the coating can easily be washed off from the coated sheets with water.

EP-A 0 548 822 describes PMMA sheets and polycarbonate sheets which contain special pearlescent pigments in the coextrusion layer. These pearlescent pigments consist of a support material, e.g. mica, which is covered with a layer of titanium dioxide of thickness 60 to 120 nm.

The production of these pearlescent pigments is described in DE-A 196 18 569, for example. EP-A 0 548 822 teaches that a selectivity parameter (SP) greater than 1.15 is necessary in order to achieve sufficient IR reflection. The SP is defined as follows.

The ratio T/g is also termed the selectivity parameter SP (according to DIN 67 507). This ratio is the percentage light transmission in the visible region divided by the percentage transparency to radiant energy. The SP is a measure of the IR reflection and in this respect is also a measure of the efficacy of solar protection glazing; it should therefore be as high as possible.

It is known that the sheets described in EP-A 0 548 822 contain 20 to 40% by weight of a pearlescent pigment in the coextrusion layer in order to achieve the requisite high selectivity parameters. A disadvantage is that it is necessary to use a high content of pearlescent pigment. These sheets are therefore very costly.

DE-A 100 06 651 teaches that pearlescent pigments which comprise three or more layers of titanium dioxide and silica on mica result in a particularly low extent of yellowing due to weathering during the weathering of plastics materials which contain these pigments.

Pearlescent pigments have the disadvantage that they result in a matt surface when they are used in an outer layer of a multilayered product.

Moreover, a high content of pearlescent pigment is necessary.

DETAILED DESCRIPTION OF THE INVENTION

The object of the present invention is thus to provide IR-reflecting product with selectivity parameters (SP) greater than 1.15, the surface of which has a high gloss and the properties are attained with relatively small amounts of pearlescent pigments.

This object is achieved by providing a multilayered product comprising three layers A, B and C, wherein layer A contains a transparent thermoplastic plastics material, and wherein layer B contains a transparent thermoplastic plastics material and a pigment the structure of which includes a transparent support material and a titanium dioxide layer of thickness 150 to 200 nm over the support material, and wherein layer C contains a transparent thermoplastic plastics material, and wherein further layers may be deposited over the titanium dioxide layer.

The concentration of the pigment may be optimized in routine tests by one skilled in the art. The concentration is selected so that the SP is greater than 1.15. The concentration also depends, of course, on the thickness of layer B.

If further layers are deposited over the titanium dioxide layer, these are designed so that an SP greater than 1.15 is maintained.

One particular embodiment of the present invention entails layer B that is 15 to 250 µm thick.

In another particular embodiment of the present invention the transparent thermoplastic plastics material which is contained in layers A, B and C is independently selected from the group consisting of polycarbonate, polymethyl methacrylate, modified PMMAs (these are copolymers of methyl methacrylate and butyl methacrylate or of butyl acrylate or other commonly used comonomers), ABS, polystyrene, styrene-acrylonitrile copolymers, PVC and polyesters, particularly those comprising recurring units derived from ethylene glycol and/or cyclohexane-dimethanol and/or butylene glycol and terephthalic acid and/or isophthalic acid and mixtures thereof.

In a further particular embodiment the transparent thermoplastic plastics material of at least one of layers A, B and C is a copolyester derived from dicarboxylic acids and diols, wherein the dicarboxylic acids are selected from the group consisting of terephthalic acid, isophthalic acid and cyclohexane-1,4-dicarboxylic acid and wherein the diols are selected from the group consisting of ethylene glycol, cyclohexane-dimethanol and diethylene glycol, and wherein the recurring units which are derived from diethylene glycol have a content of less than 5 mol % relative to the moles of all recurring units derived from diols.

Cyclohexane-dimethanol has the following structure:

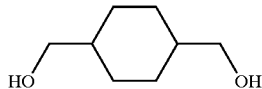

In a further particular embodiment layer B is situated between layers A and C.

In a further particular embodiment the multilayered product is a member selected from the group consisting of sheets, solid sheets, corrugated sheets and multi-wall sheets.

The present invention further relates to the use of the multilayered product according to the invention for producing decorative panels for wall claddings, partition walls, ceiling claddings, false ceilings, glazing for greenhouses, glazing for conservatories, glazing for bus stops, roofing, glazing which attenuates incidental light or for the replacement of coats of paint and for thermal insulation.

The present invention also relates to a product containing the multilayered product according to the invention.

This product is preferably selected from the group consisting of wall claddings, partition walls, ceiling claddings, false ceilings, glazing for greenhouses, glazing for conservatories, glazing for bus stops, roofing, glazing which attenuates incident light and replacement products for coats of paint.

In another particular embodiment layer B is situated between layers A and C.

In a further particular embodiment the multilayered product is selected from the group consisting of sheets, solid sheets, corrugated sheets and multi-wall sheets.

The present invention also relates to the use of the multilayered product for producing decorative panels for wall claddings, partition walls, ceiling claddings, false ceilings, glazing for greenhouses, glazing for conservatories, glazing for bus stops, roofing, glazing which attenuates incidental light or for the replacement of coats of paint and for thermal insulation.

The present invention also relates to a product containing the multilayered product according to the invention.

Said product is preferably selected from the group consisting of wall claddings, partition walls, ceiling claddings, false ceilings, glazing for greenhouses, glazing for conservatories, glazing for bus stops, roofing, glazing which attenuates incidental light and replacement products for coats of paint and for thermal insulation.

In addition to layers A, B and C, the inventive multilayered product may contain other layers. The sequence of the layers is arbitrary. Layer B is preferably situated between layers A and C. Other preferred sequences of layers A, B and C are as follows: C-B-A-C, C-B-A-B-C or C-B-A-B.

Layers A, B and C may each be made of different plastic materials. If a plurality of layers of the same type are used (as in C-B-A-B-C, for example), layers of the same type (in the example: two layers B and two layers C) may be made of different compositions.

The pigment according to the invention consists of a transparent support material which is coated with a titanium dioxide layer of thickness 150 to 200 nm. Pigments of this type are known and are available commercially. Preferably these pigments have a dish-like structure with a diameter of 1 to 80 µm and a thickness of 0.4 to 2.0 µm.

The transparent support material is a member selected from the group consisting of layer silicate such as mica, glass platelets, $PbCO_3 \times Pb(OH)_2$, BiOCl in the form of platelets, or lamellar silica such as is produced by the method described in WO 93/108237.

The multilayered product according to the invention has the advantage of possessing a selectivity parameter greater than 1.15 and a surface with a high gloss (preferably >40%, more preferably >70%). At the same time, only a small amount of the pigment according to the invention is necessary.

The multilayered products according to the invention may be used as thermal insulation glazing.

Layer B of the multilayered product according to the invention is preferably 15 to 250 µm thick, particularly 20 to 150 µm thick, most preferably 25 to 70 µm thick.

Layer C of the multilayered product according to the invention is preferably 5 to 1000 µm thick.

The transparent thermoplastic plastics material which is contained in layers A, B and C of the multilayered product according to the invention is independently preferably selected from the group consisting of polycarbonate, polymethyl methacrylate, modified PMMAs (these are copolymers of methyl methacrylate and butyl methacrylate or butyl acrylate or other commonly used comonomers), ABS, polystyrene, a styrene-acrylonitrile copolymer, PVC, and polyesters, particularly those with recurring units derived from ethylene glycol and/or cyclohexane-dimethanol and/or butylene glycol and terephthalic acid and/or isophthalic acid and/or cyclohexane-1,4-dicarboxylic acid and mixtures thereof.

Cyclohexane-1,4-dicarboxylic acid has the formula:

The transparent thermoplastic plastic material which is contained in layers A, B and C of the multilayered product according to the invention may also be the polyester which is disclosed in U.S. Pat. No. 5,986,040 incorporated herein by reference. It may also be the plastics material composition which is disclosed in WO 99/63002, or may also be the plastics material which is disclosed in WO 069945.

Polycarbonate is particularly preferred, especially the homopolycarbonate based on bisphenol A.

In order to increase the resistance to weathering of the inventive multilayered products both the uppermost layer and the middle layer may contain UV absorbers. The latter may be present in the different layers in different amounts.

The inventive multilayered product may be produced by coextrusion, melt-laminating, lacquer-coating or laminating.

Coextrusion is preferred.

Layer C of the inventive product may additionally contain UV absorbers, thermal stabilizers, optical brighteners, colorants and other additives.

Layer C may additionally contain 0 to 5% by weight of the pigment which is contained in layer B.

Layers A, B and C, independently of each other, may additionally contain UV absorbers, thermal stabilizers, optical brighteners, colorants and other additives.

In particular, the inventive multilayered products may be solid sheets, corrugated sheets and multi-wall sheets (e.g. twin-wall sheets, triple-wall sheets, corrugated multi-wall sheets). These sheets also include those which have an additional outer layer which comprises a molding composition with an increased content of UV absorbers, on one side or on both sides.

The multilayered products according to the invention have pearlescent surfaces. They may therefore be used as decorative sheets for wall claddings, partition walls, ceiling claddings, false ceilings, glazing which attenuates incident light, for modern room design, for optically responsive facade glazing, or for the replacement of coats of paint and for thermal insulation.

It is possible to effect subsequent processing of the multilayered products according to the invention, e.g. by thermoforming, or by surface treatment such as the application of scratch-resistant lacquers, water-spreading layers and the like, and the present invention also relates to the products produced by these processes.

Thermoplastic, aromatic polycarbonates suitable in the present context are homopolycarbonates, copolycarbonates and thermoplastic polyester carbonates. They have weight average molecular weights ($M_W$) of 18,000 to 40,000, preferably 20,000 to 36,000, and particularly 22,000 to 35,000, as determined by measuring the relative solution viscosity of a solution of the polycarbonate in dichloromethane or in mixtures containing identical amounts by weight of phenol and o-dichlorobenzene at 25° C., calibrated by light scattering.

Such polycarbonate have been disclosed in for example, "Schnell", Chemistry and Physics of Polycarbonates, Polymer Reviews, Vol. 9, Interscience Publishers, New York, London, Sydney 1964, D.C. PREVORSEK, B. T. DEBONA and Y. KESTEN, Corporate Research Center, Allied Chemical Corporation, Morristown, N.J. 07960, "Synthesis of Poly(ester)carbonate Copolymers" in the Journal of Polymer Science, Polymer Chemistry Edition, Vol. 19, 75–90 (1980), D. Freitag, U. Grigo, P. R. Müller, N. Nouvertne, BAYER AG, "Polycarbonates" in the Encyclopedia of Polymer Science and Engineering, Vol. 11, Second Edition, 1988, pages 648–718, and finally Drs. U. Grigo, K. Kircher and P. R. M üller "Polycarbonate" in Becker/Braun, Kunststoff-Handbuch, Volume 3/1, Polycarbonates, Polyacetals, Polyesters, Cellulose Esters, Carl Hanser Verlag Munich, Vienna, 1992, pages 117–299. Production is preferably effected by the phase boundary method or by the melt esterification method both methods are well known.

The compounds which are preferably used as starting materials are bisphenols of general formula HO—Z—OH, wherein Z is a divalent organic radical comprising 6 to 30 carbon atoms which contains one or more aromatic groups. Examples of compounds such as these include bisphenols which form part of the group comprising dihydroxydiphenyls, bis(hydroxyphenyl)alkanes, indanebisphenols, bis(hydroxy-phenyl)ethers, bis(hydroxyphenyl) sulphones, bis(hydroxyphenyl)ketones and α,α-bis (hydroxyphenyl)-diisopropylbenzenes.

Particularly preferred bisphenols which form part of the aforementioned group of compounds include bisphenol A, tetraalkylbisphenol A, 4,4-(meta-phenylene-diisopropyl) diphenol (bisphenol M), 4,4-(para-phenylene-diisopropyl) diphenol, 1,1-bis-(4-hydroxyphenyl)-3,3,5-trimethylcyclohexane (bisphenol-TMC) and optionally mixtures thereof. Homopolycarbonates based on bisphenol A and copolycarbonates based on the monomers bisphenol A and 1,1-bis-(4-hydroxy-phenyl)-3,3,5-trimethylcyclohexane are particularly preferred. The bisphenol compounds which are used according to the invention are reacted with compounds of carbonic acid, particularly phosgene, or with diphenyl carbonate or dimethylcarbonate by a melt transesterification process.

Polyester carbonates may be obtained by the reaction of the aforementioned bisphenols with at least one aromatic dicarboxylic acid and optionally with carbonic acid equivalents. Examples of suitable aromatic dicarboxylic acids include phthalic acid, terephthalic acid, isophthalic acid, 3,3- or 4,4-diphenyldicarboxylic acid and benzophenonedicarboxylic acids. Part of the carbonate groups in the polycarbonates, namely up to 80 mol %, preferably from 20 to 50 mol % thereof, may be replaced by aromatic dicarboxylic acid ester groups.

Examples of inert organic solvents used in the interfacial polycondensation process include dichloromethane, various dichloroethane and chloropropane compounds, tetrachloromethane, trichloromethane, chlorobenzene and chlorotoluene. Chlorobenzene, dichloromethane or mixtures of dichloromethane and chlorobenzene are preferably used.

The interfacial polycondensation process may be speeded up by catalysts such as tertiary amines, particularly N-alkylpiperidine, or onium salts. Tributylamine, triethylamine and N-ethylpiperidine are preferably used. In the case of the melt transesterification process, the catalysts cited in DE 4238123 are used.

The polycarbonates may be deliberately branched in a controlled manner by the use of small amounts of branching agents. Some suitable branching agents are: phloroglucinol, 4,6-dimethyl-2,4,6-tri-(4-hydroxyphenyl)-heptene-2; 4,6-dimethyl-2,4,6-tri-(4-hydroxyphenyl)-heptane; 13,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxy-phenyl)-cyclohexyl]-propane; 2,4-bis-(4-hydroxyphenyl-isopropyl)-phenol; 2,6-bis-(2-hydroxy-5-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthotere-phthalic acid ester; tetra-(4-hydroxyphenyl)-methane; tetra-(4-(4-hydroxyphenyl-isopropyl)-phenoxy)-methane; α,α',α"-tris-(4-hydroxyphenyl)-1,3,5-triisopropyl-benzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxy-triphenyl)-methyl)-benzene, and particularly: 1,1,1-tri-(4-hydroxyphenyl)-ethane and bis-(3-methyl-4-hydroxyphenyl)-2-oxo-2,3-dihydroindole.

The 0.05 to 2 mol %, with respect to the diphenols used, of Gbranching agents or mixtures of branching agents which are optionally used in conjunction may be added together with the diphenols or may be added at a later stage of the synthesis.

Phenols such as phenol, alkylphenols such as cresol and 4-tert.-butylphenol, chlorophenol, bromophenol, cumylphenol or mixtures thereof are preferably used as chain terminators in amounts of 1–20 mol %, preferably 2–10 mol % per mol of bisphenol. Phenol, 4-tert.-butylphenol or cumylphenol are preferred.

The chain terminators and branching agents may be added to the syntheses separately or together with the bisphenol.

The production of polycarbonates for the coextrusion molding compositions according to the invention by the melt transesterification process is described in DE 4 238 123, for example.

UV absorbers are incorporated in the thermoplastic coextrusion molding compositions according to the invention by customary methods, for example by mixing solutions of the UV absorbers with solutions of the plastics materials in suitable organic solvents such as $CH_2Cl_2$, halogenated alkanes, halogenated aromatic compounds, chlorobenzene and xylenes. The mixtures of substances are then homogenized by extrusion in the known manner; the mixtures of solvents are removed in the known manner by evaporation of the solvents and subsequent extrusion, and may be compounded for example.

Examples of suitable stabilizers for the polycarbonates for the coextrusion molding compositions according to the invention include phosphines, phosphates, epoxides or stabilizers which contain Si, as well as other compounds which are described in EP 0 500 496 A1 and U.S. Pat. No. 3,673,146. Examples thereof include triphenylphosphine, diphenylalkyl-phosphites, phenyldialkyl phosphites, tris-(nonylphenyl)phosphite, tetrakis-(2,4-di-tert.-butylphenyl)-4,4'-biphenylene diphosponite and triaryl phosphates. Triphenylphosphine and tris-(2,4-di-tert.-butylphenyl)phosphite are particularly preferred.

The coextrusion molding compositions according to the invention may be used for the coextrusion of sheets. These sheets may be provided with coextruded layers on one side or on both sides.

Coextrusion as such is known from the literature (see EP 110 221 and EP 110238, for example).

Suitable UV absorbers for the coextrusion compositions which are optionally used in conjunction are those compounds which due to their absorption capacity below 400 nm are capable of effectively protecting polycarbonates from UV light and which have a molecular weight higher than 370, preferably of 500 or more.

UV absorbers which are particularly suitable are the compounds of formula (II) which are described in WO 99/05205:

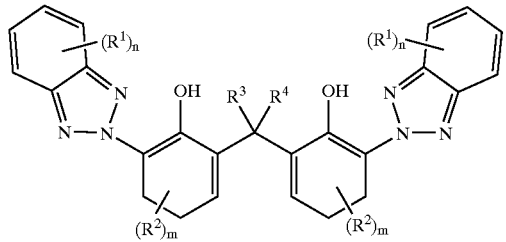
(II)

wherein $R^1$ and $R^2$ are identical or different, and denote
H, a halogen, a $C_1$–$C_{10}$ alkyl, a $C_5$–$C_{10}$ cycloalkyl, a $C_7$–$C_{13}$ aralkyl, a $C_6$–$C_{14}$ aryl, —$OR^5$ or —(CO)—O—$R^5$, where $R^5$=H or $C_1$–$C_4$-alkyl, $R^3$ and $R^4$ are likewise identical or different, and denote
H, a $C_1$–$C_4$ alkyl, a $C_5$–$C_6$ cycloalkyl, benzyl or a $C_6$–$C_{14}$ aryl, m is 1,2 or 3 and n is 1,2,3 or 4,
as well as those of formula (III)

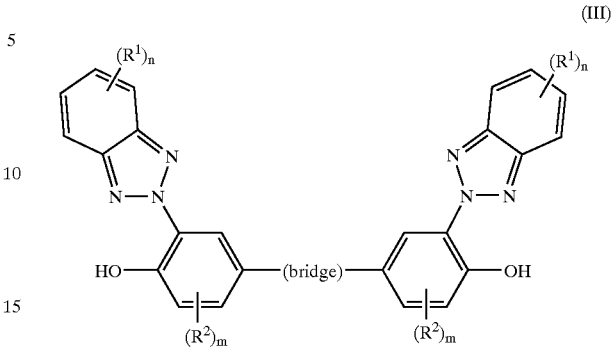
(III)

wherein the bridge denotes

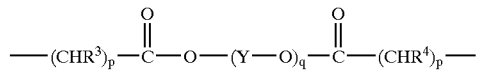

wherein $R^1$, $R^2$, m and n have the meanings given for formula (II),
wherein in addition p is an integer from 0 to 3,
q is an integer from 1 to 10,
Y is —$CH_2$—$CH_2$—, —$(CH_2)_3$—, —$(CH_2)_4$—, —$(CH_2)_5$—, —$(CH_2)_6$—, or $CH(CH_3)$—$CH_2$—, and
$R^3$ and $R^4$ have the meanings given for formula (II).

Other suitable UV absorbers are those which constitute substituted triazines, such as 2,4-bis(2,4-dimethylphenyl)-6-(2-hydroxy-4-n-octyloxy-phenyl)-,3,5-triazine (CYASORB® UV-1164) or 2-(4,6-diphenyl-1,3,5-triazin-2-yl)-5-(hexyl)oxy-phenol (Tinuvine 1577). 2,2-methylenebis-(4-(1,1,3,3-tetramethylbutyl)-6-(2H-benztriazol-2-yl)phenol), which is marketed commercially under the trademark Tinuvin® 360 or Adeka Stab® LA 31, is particularly preferred as a UV absorber. The UV absorbers cited in EP 0500496 A1 are also suitable. The product marketed under the trademark Uvinul 3030 by BASF AG, may also be used.

Examples of antistatic agents include cation-active compounds, for example quarternary ammonium, phosphonium or sulphonium salts, anion-active compounds, for example alkyl sulphonates, alkyl sulphates or alkyl phosphates, carboxylates in the form of alkali metal or alkaline earth metal salts, non-ionogenic compounds, for example polyethylene glycol esters, polyethylene glycol ethers, esters of fatty acids, and ethoxylated fatty amines. The preferred antistatic agents are non-ionogenic compounds.

The preferred fillers are glass fibers, mica, silicates, quartz, French chalk, titanium dioxide or wollastonite. The preferred reinforcing agents are glass or carbon fibers.

All the starting materials and solvents used for the synthesis of the molding compositions according to the invention may be contaminated with corresponding impurities which result from the manufacture and storage thereof. The aim is to work with starting materials which are as clean as possible.

Mixing of the individual constituents may be effected in the known manner, either successively or simultaneously, and either at room temperature or at an elevated temperature.

The additives are incorporated in the molding compositions according to the invention in the known manner by mixing polymer granules with the additive(s) and subsequent extrusion, or by mixing the solutions of polycarbonate with solutions of the additives and subsequently evaporating the solvents in a known manner. The content of additives in the molding composition may be varied within wide limits and depends on the desired properties of the molding composition. The total content of additives in the molding composition ranges up to about 40% by weight, preferably 4 to 30% by weight, with respect to the weight of the molding composition.

The polymer compositions which are thus obtained may be converted into molded articles by the usual methods, e.g. by hot pressing, pinning, extrusion or injection molding. Examples of molded articles include parts for toys, and also fibers, films, ribbons, sheets, vessels, tubes and other shapes. Therefore, the invention also relates to the use of the polymer compositions according to the invention for producing a molded article. The use of multilayered systems is also of interest.

The invention is explained in greater detail by the following example, without being limited thereto.

EXAMPLES 10 mm twin-wall sheets A, B, C, and 16 mm triple-wall sheets D and E, as described in EP-A 0 110 238, for example (described there as multilayered hollow chamber plastics panels) were obtained from the following molding compositions: Makrolone 1243 (a branched bisphenol A polycarbonate manufactured by Bayer AG, Leverkusen, with a melt flow index (MFR) according to ISO 1133 of 6.5 g/10 min at 300° C. and a loading of 1.2 kg) was used as the base material ("base material" means the material that forms the sheet except for the material that forms the coextruded part of the sheet). This was coextruded with the compounds based on Makrolon® 3108 (a linear bisphenol A polycarbonate manufactured by Bayer AG, Leverkusen, with a melt flow index (MFR) according to ISO 1133 of 6.5 g/10 min at 300° C. and a loading of 1.2 kg) which are given in Table 1. The thickness of the middle coextruded layer was about 60 μm and the thickness of the outer layer was about 45 μm.

The machines and apparatuses used to produce the multilayered sheets are described below:

The arrangement consisted of:
a main extruder with a worm of length 33 D and a diameter of 70 mm, with a degassing facility
a coextrusion adapter (feed block system)
two coextruders for depositing the intermediate layer and the outer layer, each comprising a worm of length 25 D and a diameter of 30 mm
a special sheet die of width 350 mm
a calibrator
a roller conveyor
a pull-off device
a device for cutting to length (saw)
a delivery table.

The granular polycarbonate of the base material was introduced into the filling hopper of the main extruder, and the UV coextrusion material was introduced into that of the respective coextruder. The respective material was melted and conveyed in the respective barrel/worm plasticizing system. Both fused materials were brought together in the coextrusion adapter and after leaving the extrusion die and cooling in the calibrator they formed a composite. The other devices were employed for the transport, cutting to length and deposition of the extruded sheets.

The sheets obtained were subsequently subjected to calorimetric evaluation. The following methods of measurement were employed:

1. The transmission was determined according to the ASTM E 308/ASTM D 1003 Standards.

2. The yellowness index was determined according to ASTM Specification E 313.

3. The gloss was determined according to ASTM Specification D 523.

4. The selectivity parameter was determined according to DIN Specification 67507.

Coextrusion molding compositions were produced using the formulations given in Table 1, which were based on Makrolon® 3108.

TABLE 1

| No. | Formulation (data in % by weight) (resin used: Makrolon ® 3108) |
|---|---|
| 1 | 10% conventional pigment[1] + 5% Tinuvin ® 360[4] |
| 2 | 20% conventional pigment[2] + 5% Tinuvin ® 360[4] |
| 3 | 14% pigment according to the invention[3] + 5% Tinuvin ® 360[4] |
| 4 | 19% conventional pigment[2] |
| 5 | 14% pigment according to the invention[3] |
| 6 | Makrolon ® 3108 + 5% Tinuvin 360[4] |

The formulation of Table 1 are the composition of layer B and of the corresponding layers B in comparative examples.

1)=Magna Pearl® 1000 supplied by Costenoble GmbH, Eschborn, Germany

2)=Iriodin® AC 870 supplied by Merck KGaA, Darmstadt, Germany

3)=Iriodin® 9223 supplied by Merck KGaA, Darmstadt, Germany

4)=2,2'-methylene-bis[4-(1,1,3,3-tetramethylbutyl)-6-(2H-benzo-triazol-2-yl)phenol] supplied by Ciba Specialty Chemicals, Lampertheim, Germany.

The structure of the pigments was as follows:

The core (support) consisted of mica in all cases.

Magna Pearl® 1000:

Thickness of the $TiO_2$ layer over the core: 60–110 nm

Iriodin® AC 870:

Thickness of the innermost $TiO_2$ layer over the core: 110–120 nm

Thickness of the middle $SiO_2$ layer: 110–140 nm

Thickness of the outermost $TiO_2$ layer: 120–150 nm

Iriodin® 9223:

Thickness of the $TiO_2$ layer over the core: 150–200 nm.

The batches listed in Table 1 were coextruded on to 10 mm double-wall sheets (Table 2) and on to 16 mm triple-wall sheets (Table 3) made of Makrolon® 1243.

TABLE 2

| No. | Middle coextrusion layer | Outer coextrusion layer |
|---|---|---|
| A | none present | Batch 1 |
| B | none present | Batch 2 |
| C | none present | Batch 3 |

TABLE 3

| No. | Middle coextrusion layer | Outer coextrusion layer |
|---|---|---|
| D | Batch 4 | Batch 6 |
| E | Batch 5 | Batch 6 |

The gloss and the selectivity parameters of the multi-wall sheets were measured. The results are given in Table 5.

TABLE 5

| No. | Gloss (60°) | Selectivity parameter |
|-----|-------------|----------------------|
| A   | 19%         | 0.81                 |
| B   | 18%         | 1.13                 |
| C   | 14%         | 1.29                 |
| D   | 99%         | 1.14                 |
| E   | 98%         | 1.27                 |

As shown in Table 5, only sheets E complied with the desired property profile. The gloss of sheets A, B and C was much too low. The selectivity parameter of sheet D was too low (less than 1.15).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A multilayered article having a selectivity parameter determined according to DIN specification 67507 greater than 1.15 and a 60° gloss value greater than 40% comprising:

(A) a transparent layer of a thermoplastic material,
   (B) a transparent layer of a composition that contains a transparent thermoplastic material and a pigment, the pigment including a transparent support material having a mean particle size of 4 μm to 5 μm and a titanium dioxide layer of thickness 150 to 200 nm adhering to at least one surface of said support, and
   C) a transparent layer of a thermoplastic material.

2. The multilayered article according to claim 1, wherein layer B is 15 to 250 μm thick.

3. The multilayered article according to claim 1 wherein the transparent thermoplastic plastic material contained in layers A, B and C independently is selected from the group consisting of polycarbonate, polymethyl methacrylate, modified PMMA, ABS, polystyrene, styrene-acrylonitrile copolymer, PVC and polyester.

4. The multilayered article according to claim 1 wherein the transparent thermoplastic plastics material of at least one of layers A, B and C is a copolyester derived from dicarboxylic acid and diol, wherein the dicarboxylic acid is at least one member selected from the group consisting of terephthalic acid and isophthalic acid, and wherein diol is at least one member selected from the group consisting of ethylene glycol, cyclohexane-dimethanol and diethylene glycol, provided that the recurring units derived from diethylene glycol are less than 5% relative to the molar amounts of said diol.

5. The multilayered article according to claim 1 wherein layer B is situated between layers A and C.

6. The multilayered article according to claim 1 selected from the group consisting of solid sheets, corrugated sheets and multi-wall sheets.

7. A process for the production of the multilayered article of claim 1 comprising the coextrusion of the layers (A), (B) and (C).

8. The multilayered article according to claim 1 wherein the thermoplastic material of at least one of layers A, B, and C is polycarbonate.

* * * * *